United States Patent
Weismantel et al.

(10) Patent No.: US 9,919,284 B2
(45) Date of Patent: Mar. 20, 2018

(54) DEVICE FOR PRODUCING WATER-ABSORBENT POLYMER PARTICLES

(75) Inventors: Matthias Weismantel, Jossgrund-Oberndorf (DE); Rüdiger Funk, Niedernhausen (DE); Leigh R. Blair, Greenwood Springs, MS (US); Kevin D. Heitzhaus, Suffolk, VA (US)

(73) Assignee: BASF SE, Ludwigshafen (DE)

(*) Notice: Subject to any disclaimer, the term of this patent is extended or adjusted under 35 U.S.C. 154(b) by 1331 days.

(21) Appl. No.: 12/746,910

(22) PCT Filed: Dec. 16, 2008

(86) PCT No.: PCT/EP2008/067617
§ 371 (c)(1),
(2), (4) Date: Jun. 8, 2010

(87) PCT Pub. No.: WO2009/077526
PCT Pub. Date: Jun. 25, 2009

(65) Prior Publication Data
US 2010/0258965 A1    Oct. 14, 2010

Related U.S. Application Data

(60) Provisional application No. 61/014,109, filed on Dec. 17, 2007.

(51) Int. Cl.
*B01J 19/22* (2006.01)
*F16G 3/04* (2006.01)

(52) U.S. Cl.
CPC .............. *B01J 19/22* (2013.01); *F16G 3/04* (2013.01)

(58) Field of Classification Search
USPC ..................... 425/115, 126.1, 471
See application file for complete search history.

(56) References Cited

U.S. PATENT DOCUMENTS

| | | | |
|---|---|---|---|
| 3,436,978 A | 4/1969 | Rahmes | |
| 4,647,641 A * | 3/1987 | Westbrook | 528/24 |
| 4,857,610 A | 8/1989 | Chmelir et al. | |
| 4,893,999 A | 1/1990 | Chmelir et al. | |
| 5,360,379 A | 11/1994 | Carelli et al. | |
| 6,000,532 A | 12/1999 | Eckhardt | |
| 6,194,508 B1 * | 2/2001 | Achenbach et al. | 524/492 |

(Continued)

FOREIGN PATENT DOCUMENTS

| | | |
|---|---|---|
| DE | 1209732 B | 1/1966 |
| DE | 3210392 C1 | 10/1983 |

(Continued)

OTHER PUBLICATIONS

International Search Report for corresponding International Application No. PCT/EP2008/067617, dated Apr. 27, 2009.

(Continued)

*Primary Examiner* — James Sanders
(74) *Attorney, Agent, or Firm* — Marshall, Gerstein & Borun LLP

(57) ABSTRACT

The present invention relates to an apparatus for producing water-absorbing polymer particles by polymerizing monomers on a continuous conveyor belt, wherein joins of the conveyor belt and/or damage on the conveyor belt surface have been sealed with a sealing composition.

7 Claims, 1 Drawing Sheet

(56) References Cited

U.S. PATENT DOCUMENTS

2006/0167198 A1    7/2006   Sasabe et al.
2008/0227932 A1    9/2008   Funk et al.

FOREIGN PATENT DOCUMENTS

| | | | |
|---|---|---|---|
| DE | 35 44 770 A1 | 6/1987 | |
| DE | 10029571 A1 | 1/2002 | |
| EP | 0864775 A1 | 9/1998 | |
| EP | 1669635 A1 | 6/2006 | |
| EP | 1 683 813 A2 | 7/2006 | |
| GB | 634028 A * | 3/1950 | ............... F16G 3/04 |
| GB | 979106 A | 1/1965 | |
| JP | H10-30683 A | 2/1998 | |
| JP | 2000-344319 A | 12/2000 | |
| JP | 2002-003509 A | 1/2002 | |
| WO | WO-2007/023097 A1 | 3/2007 | |

OTHER PUBLICATIONS

Buchholz et al. (eds.), *Modern Superabsorbent Polymer Technology*, Wiley-VCH, pp. 71-103 (1998).

\* cited by examiner

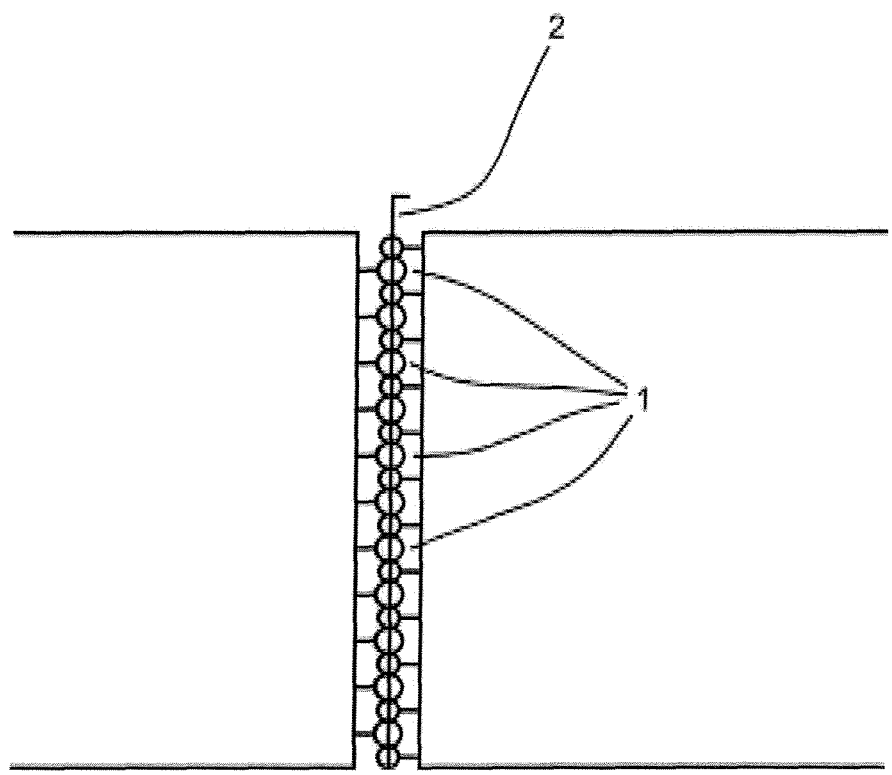

DEVICE FOR PRODUCING WATER-ABSORBENT POLYMER PARTICLES

CROSS-REFERENCE TO RELATED APPLICATIONS

This is the U.S. national phase of International Application No. PCT/EP2008/067617, filed Dec. 16, 2008, which claims the benefit of U.S. Provisional Patent Application No. 61/014,109, filed Dec. 17, 2007, incorporated herein by reference in its entirety.

The present invention relates to an apparatus for producing water-absorbing polymer particles by polymerizing monomers on a continuous conveyor belt, wherein joins of the conveyor belt and/or damage on the conveyor belt surface have been sealed with a sealing composition.

The production of water-absorbing polymer particles is described in monograph "Modern Superabsorbent Polymer Technology", F. L. Buchholz and A. T. Graham, Wiley-VCH, 1998, pages 71 to 103.

Water-absorbing polymers are used to produce diapers, tampons, sanitary napkins and other hygiene articles, but also as water-retaining agents in market gardening.

DE 35 44 770 A1 describes an apparatus for producing water-absorbing polymer particles on a continuous conveyor belt.

EP 1 683 813 A2 discloses an apparatus for producing water-absorbing polymer particles on a continuous conveyor belt, wherein the conveyor belt surface consists of a fluororesin with a low softening point.

When assembled on the apparatus, the ends of the conveyor belt have to be joined together to form a continuous belt. To this end, the belt ends can, for example, be adhesive-bonded while overlapping. A disadvantage of this method is the slow curing of the adhesion site and the associated production shutdown. In addition, monomer solution or suspension can penetrate into the gap which arises at the join and attack it by polymerization. Moreover, polymer gel residues can remain adhering at the overlap edge or the dead spaces caused by the overlap edge.

BRIEF DESCRIPTION OF THE DRAWING

FIG. 1 illustrates a releasable mechanical connector for a conveyor belt having loops (1) and a coupling bar (2).

It was an object of the present invention to provide an improved apparatus for producing water-absorbing polymer particles. More particularly, it is an object of the present invention to provide conveyor belts which are easy to assemble, have a long lifetime and can be repaired in a simple manner.

This object is achieved by an apparatus for producing water-absorbing polymer particles by polymerizing monomers on a continuous conveyor belt, wherein joins of the conveyor belt and/or damage on the conveyor belt surface have been sealed with a sealing composition.

The sealing of the join allows penetration of monomer solution or suspension to be prevented and the lifetime of the conveyor belt to be increased. Damage to the conveyor belt surface can likewise be sealed, which re-establishes the conveyor belt surface and avoids enlargement of the damage site.

In a preferred embodiment of the present invention, the conveyor belt is, though, connected to form a continuous belt by means of at least one mechanical connector. The mechanical connectors may be releasable or unreleasable, but preference is given to releasable mechanical connectors.

Suitable unreleasable mechanical connectors are, for example, small metal plates which are riveted to the two ends of the conveyor belt.

Suitable releasable mechanical connectors are, for example, loops at the two ends of the conveyor belt, in which case the loops of the two ends of the conveyor belt are connected to one another by means of at least one coupling bar. FIG. 1 shows an example of such a connection with a multitude of loops (1) and one coupling bar (2).

The use of the mechanical connectors enables faster assembly and faster startup of the conveyor belt. The sealing composition cures significantly faster than the adhesion sites customary to date. More particularly, the unavoidable tensile stress is kept away from the sealing composition by the mechanical connectors.

The conveyor belt should have a sufficient tensile strength and flexural strength, and also a good flexibility and chemical stability. Surface-coated fabrics are therefore used advantageously as conveyor belts. Suitable fabric materials are, for example, natural and synthetic fibers, glass fibers and steel. However, preference is given to using fabrics based on synthetic fibers, especially polyester fibers.

Suitable materials for the top side of the conveyor belt are, for example, polyethylene, polypropylene, polyisobutylene, halogenated polyolefins such as polyvinyl chloride or polytetrafluoroethylene, polyamides, natural or synthetic rubbers, polyester resins or epoxy resins. The preferred material for the conveyor belt surface is silicone rubber.

Suitable sealing compositions are, for example, sealing compositions based on polyacrylates or polyurethanes. The preferred sealing compositions are sealing compositions based on silicone rubber. The sealing compositions advantageously have a minimum shrinking tendency.

The sealing compositions used should have a sufficient thermal stability. The sealing compositions are therefore stable preferably up to at least 140° C., more preferably up to at least 190° C., most preferably up to at least 220° C.

In addition, the sealing compositions used should be hydrophobic, flexible, smooth, and stable toward UV radiation and acids.

With respect to water, the hydrophobic sealing compositions have a contact angle of preferably at least 60°, preferentially at least 70°, more preferably at least 80°, most preferably at least 90°. The contact angle is a measure for the wetting behavior of a liquid with respect to a surface and can be determined by customary methods, preferably to ASTM D 5725. A low contact angle means good wetting, and a high contact angle poor wetting.

The present invention further provides a process for producing water-absorbing polymer particles by polymerizing a monomer solution or suspension on the continuous conveyor belt of the inventive apparatus.

In the process according to the invention, it is possible, for example, to use aqueous monomer solutions or suspensions comprising
  a) at least one ethylenically unsaturated, acid-bearing monomer which may be at least partly neutralized,
  b) at least one crosslinker,
  c) optionally one or more ethylenically and/or allylically unsaturated monomers copolymerizable with the monomers mentioned under a) and
  d) optionally one or more water-soluble polymers.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 50 g/100 g of water. Ideally, the monomers a) are miscible with water in any ratio.

Suitable monomers a) are, for example, ethylenically unsaturated carboxylic acids such as acrylic acid, methacrylic acid, maleic acid, fumaric acid and itaconic acid. Particularly preferred monomers are acrylic acid and methacrylic acid. Very particular preference is given to acrylic acid.

Further suitable monomers a) are, for example, ethylenically unsaturated sulfonic acids such as styrenesulfonic acid and 2-acrylamido-2-methylpropanesulfonic acid (AMPS).

The content of acrylic acid and/or salts thereof in the total amount of monomers a) is preferably at least 50 mol %, more preferably at least 90 mol %, most preferably at least 95 mol %.

The monomers a), especially acrylic acid, comprise preferably up to 0.025% by weight of a hydroquinone monoether. Preferred hydroquinone monoethers are hydroquinone monomethyl ether (MEHQ) and/or tocopherols.

Tocopherol refers to compounds of the following formula

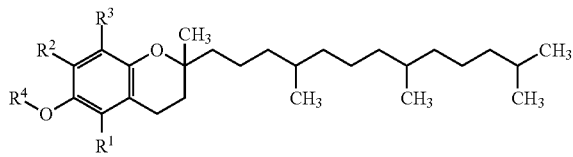

where $R^1$ is hydrogen or methyl, $R^2$ is hydrogen or methyl, $R^3$ is hydrogen or methyl and $R^4$ is hydrogen or an acyl radical having from 1 to 20 carbon atoms.

Preferred $R^4$ radicals are acetyl, ascorbyl, succinyl, nicotinyl and other physiologically tolerable carboxylic acids. The carboxylic acids may be mono-, di- or tricarboxylic acids.

Preference is given to alpha-tocopherol where $R^1=R^2=R^3=$methyl, especially racemic alpha-tocopherol. $R^1$ is more preferably hydrogen or acetyl. Especially preferred is RRR-alpha-tocopherol.

The monomer solution comprises preferably not more than 130 ppm by weight, more preferably not more than 70 ppm by weight, preferably not less than 10 ppm by weight, more preferably not less than 30 ppm by weight and especially about 50 ppm by weight of hydroquinone monoether, based in each case on acrylic acid, with acrylic acid salts being counted as acrylic acid. For example, the monomer solution can be prepared using acrylic acid having an appropriate hydroquinone monoether content.

Crosslinkers b) are preferably compounds having at least two polymerizable groups which can be polymerized by a free-radical mechanism into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallyloxyethane, as described in EP 530 438 A1, di- and triacrylates, as described in EP 547 847 A1, EP 559 476 A1, EP 632 068 A1, WO 93/21237 A1, WO 2003/104299 A1, WO 2003/104300 A1, WO 2003/104301 A1 and in DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/32962 A2.

Suitable crosslinkers b) are in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate or ethylene glycol dimethacrylate, and also trimethylolpropane triacrylate and allyl compounds such as allyl (meth)acrylate, triallyl cyanurate, diallyl maleate, polyallyl esters, tetraallyloxyethane, triallylamine, tetraallylammonium chloride, tetraallylethylenediamine, allyl esters of phosphoric acid and vinylphosphonic acid derivatives, as described, for example, in EP 343 427 A2. Further suitable crosslinkers b) are pentaerythritol diallyl ether, pentaerythritol triallyl ether and pentaerythritol tetraallyl ether, polyethylene glycol diallyl ether, ethylene glycol diallyl ether, glycerol diallyl ether and glycerol triallyl ether, polyallyl ethers based on sorbitol, and ethoxylated variants thereof. In the process according to the invention, it is possible to use di(meth)acrylates of polyethylene glycols, the polyethylene glycol used having a molecular weight between 100 and 1000, for example polyethylene glycol-400 diacrylate.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, in particular di- and triacrylates of 2- to 6-tuply ethoxylated glycerol or of 2- to 6-tuply ethoxylated trimethylolpropane, of 3-tuply propoxylated glycerol or of 3-tuply propoxylated trimethylolpropane, and also of 3-tuply mixed ethoxylated or propoxylated glycerol or of 3-tuply mixed ethoxylated or propoxylated trimethylolpropane, of 15-tuply ethoxylated glycerol or of 15-tuply ethoxylated trimethylolpropane, and also of at least 40-tuply ethoxylated glycerol, of at least 40-tuply ethoxylated trimethylolethane or of at least 40-tuply ethoxylated trimethylolpropane.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol.

The amount of crosslinker b) is preferably from 0.05 to 1.5% by weight, more preferably from 0.1 to 1% by weight, most preferably from 0.3 to 0.6% by weight, based in each case on monomer a).

Examples of ethylenically unsaturated monomers c) which are copolymerizable with the ethylenically unsaturated, acid-bearing monomers a) are acrylamide, methacrylamide, crotonamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate.

Useful water-soluble polymers d) include polyvinyl alcohol, polyvinylpyrrolidone, starch, starch derivatives, cellulose, cellulose derivatives, polyglycols or polyacrylic acids, preferably polyvinyl alcohol and starch.

For optimal action, the preferred polymerization inhibitors require dissolved oxygen. Therefore, the monomer solution can be freed of dissolved oxygen before the polymerization by inertization, i.e. flowing through with an inert gas, preferably nitrogen. The oxygen content of the monomer solution is preferably lowered before the polymerization to less than 1 ppm by weight, more preferably to less than 0.5 ppm by weight.

Polymerization on a continuous belt forms a polymer gel, which is typically comminuted in a further process step, for example in a meat grinder, extruder or kneader.

The acid groups of the resulting polymer gels have typically been partially neutralized, preferably to an extent of from 25 to 95 mol %, more preferably to an extent of from 50 to 80 mol % and even more preferably to an extent of from 60 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

Neutralization is preferably carried out at the monomer stage. It is done typically by mixing in the neutralizing agent as an aqueous solution, as a melt, or else preferably as a solid material. For example, sodium hydroxide having a water content of distinctly below 50% by weight can be present as a waxy mass having a melting point of above 23° C. In this case, metering as piece material or melt at elevated temperature is possible.

However, it is also possible to carry out neutralization after the polymerization, at the polymer gel stage. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of a meat grinder, in which case the neutralizing agent can be sprayed, sprinkled or poured on and then carefully mixed in. To this end, the gel mass obtained can be repeatedly ground in a meat grinder for homogenization.

The polymer gel is then preferably dried with a belt dryer until the residual moisture content is preferably below 15% by weight and especially below 10% by weight, the water content being determined by EDANA (European Disposables and Nonwovens Association) recommended test method No. WSP 230.2-05 "Moisture content". If desired, however, drying can also be carried out using a fluidized bed dryer or a heated plowshare mixer. To obtain particularly white products, it is advantageous to dry this gel while ensuring rapid removal of the evaporating water. To this end, the dryer temperature must be optimized, the air feed and removal has to be controlled, and sufficient venting must be ensured in each case. The higher the solids content of the gel, the simpler the drying, by its nature, and the whiter the product. The solids content of the gel before the drying is therefore preferably between 25% and 80% by weight. It is particularly advantageous to vent the dryer with nitrogen or another nonoxidizing inert gas. If desired, however, it is also possible simply just to lower the partial pressure of the oxygen during the drying in order to prevent oxidative yellowing processes.

Thereafter, the dried polymer gel is typically ground and classified, and the apparatus used for grinding may preferably be single- or multistage roll mills, preferably two- or three-stage roll mills, pin mills, hammer mills or vibratory mills.

The mean particle size of the polymer particles removed as the product fraction is preferably at least 200 μm, more preferably from 250 to 600 μm, very particularly from 300 to 500 μm. The mean particle size of the product fraction may be determined by means of the EDANA (European Disposables and Nonwovens Association) recommended test method No. WSP 220.2-05 "Particle size distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of preferably at least 150 μm, more preferably at least 200 μm, most preferably at least 250 μm, is preferably at least 90% by weight, more preferably at least 95% by weight, most preferably at least 98% by weight.

The proportion of particles with a particle size of preferably at most 850 μm, more preferably at most 700 μm, most preferably at most 600 μm, is preferably at least 90% by weight, more preferably at least 95% by weight, most preferably at least 98% by weight.

To further improve the properties, the polymer particles may be postcrosslinked. Suitable postcrosslinkers are compounds which comprise groups which can form covalent bonds with at least two carboxylate groups of the polymer gel. Suitable compounds are, for example, alkoxysilyl compounds, polyaziridines, polyamines, polyamidoamines, di- or polyepoxides, as described in EP 83 022 A2, EP 543 303 A1 and EP 937 736 A2, di- or polyfunctional alcohols, as described in DE 33 14 019 A1, DE 35 23 617 A1 and EP 450 922 A2, or β-hydroxyalkylamides, as described in DE 102 04 938 A1 and U.S. Pat. No. 6,239,230.

Additionally described as suitable postcrosslinkers are cyclic carbonates in DE 40 20 780 C1, 2-oxazolidone and its derivatives, such as 2-hydroxyethyl-2-oxazolidone, in DE 198 07 502 A1, bis- and poly-2-oxazolidinones in DE 198 07 992 C1, 2-oxotetrahydro-1,3-oxazine and its derivatives in DE 198 54 573 A1, N-acyl-2-oxazolidones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and its derivatives in WO 2003/31482 A1.

In addition, it is also possible to use postcrosslinkers which comprise additional polymerizable ethylenically unsaturated groups, as described in DE 37 13 601 A1.

The amount of postcrosslinker is preferably from 0.001 to 2% by weight, more preferably from 0.02 to 0.1% by weight, most preferably from 0.05 to 0.2% by weight, based in each case on the polymer.

In a preferred embodiment of the present invention, polyvalent cations are applied to the particle surface in addition to the postcrosslinkers before, during or after the postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate is preferred. Apart from metal salts, it is also possible to use polyamines as polyvalent cations.

The amount of polyvalent cation used is, for example, from 0.001 to 1.5% by weight, preferably from 0.005 to 1% by weight, more preferably from 0.02 to 0.8% by weight, based in each case on the polymer.

The postcrosslinking is typically performed in such a way that a solution of the postcrosslinker is sprayed onto the polymer gel or the dry polymer particles. After the spraying, the polymer particles coated with the postcrosslinker are dried thermally, and the postcrosslinking reaction can take place either before or during the drying.

The spraying of a solution of the postcrosslinker is preferably performed in mixers with moving mixing tools, such as screw mixers, disk mixers, plowshare mixers and paddle mixers. Particular preference is given to horizontal mixers such as plowshare mixers and paddle mixers, very particular preference to vertical mixers. Suitable mixers are, for example, Lödige mixers, Bepex mixers, Nauta mixers, Processall mixers and Schugi mixers.

The postcrosslinkers are typically used as an aqueous solution. The addition of nonaqueous solvent can be used to adjust the penetration depth of the postcrosslinker into the polymer particles.

The thermal drying is preferably carried out in contact dryers, more preferably paddle dryers, most preferably disk dryers. Suitable dryers are, for example, Bepex dryers and Nara dryers. Moreover, it is also possible to use fluidized bed dryers.

The drying can be effected in the mixer itself, by heating the jacket or blowing in warm air. Equally suitable is a downstream dryer, for example a shelf dryer, a rotary tube oven or a heatable screw. It is particularly advantageous to mix and dry in a fluidized bed dryer.

Preferred drying temperatures are in the range from 100 to 250° C., preferably from 120 to 220° C., more preferably from 130 to 210° C., most preferably from 150 to 200° C. The preferred residence time at this temperature in the reaction mixer or dryer is preferably at least 10 minutes, more preferably at least 20 minutes, most preferably at least 30 minutes, and typically at most 60 minutes.

Subsequently, the postcrosslinked polymer can be classified again.

To further improve the properties, the postcrosslinked polymer particles can be coated or subsequently moistened. Suitable coatings for improving the acquisition behavior and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings against the undesired caking tendency of the polymer particles are, for example, fumed silica, such as Aerosil® 200, and surfactants, such as Span® 20.

The water-absorbing polymer particles obtainable by the process according to the invention have a centrifuge retention capacity (CRC) of typically at least 15 g/g, preferably at least 20 g/g, preferentially at least 22 g/g, more preferably at least 24 g/g, most preferably at least 26 g/g. The centrifuge retention capacity (CRC) of the water-absorbing polymer particles is typically less than 60 g/g. The centrifuge retention capacity (CRC) is determined analogously to the EDANA (European Disposables and Nonwovens Association) recommended test method No. WSP 241.2-05 "Centrifuge retention capacity".

The invention claimed is:

1. An apparatus for producing water-absorbing polymer particles by polymerizing monomers on a continuous conveyor belt, wherein the conveyor belt surface comprises silicone rubber, joins of the conveyor belt are sealed with a sealing composition based on silicone rubber, and the conveyor belt comprises at least one releasable mechanical connector.

2. The apparatus according to claim 1, wherein the at least one releasable connector can be released by disconnecting at least one coupling bar.

3. The apparatus according to claim 1, wherein the conveyor belt is a surface-coated fabric.

4. The apparatus according to claim 1, wherein the sealing composition is stable up to at least 140° C.

5. The apparatus according to claim 1, wherein the sealing composition is hydrophobic.

6. A process for producing water-absorbing polymer particles by polymerizing an aqueous monomer solution or suspension on a continuous conveyor belt of an apparatus according to claim 1.

7. The process according to claim 6, wherein the water-absorbing polymer particles have a centrifuge retention capacity of at least 15 g/g.

* * * * *